United States Patent Office 3,501,498
Patented Mar. 17, 1970

3,501,498
NITRO- AND AMINO-SUBSTITUTED 1-p-CHLORO-
BENZYL-2-METHYL-3-INDOLYLACETIC ACIDS
John Martin Chemerda, Watchung, and Meyer Sletzinger,
North Plainfield, N.J., assignors to Merck & Co., Inc.,
Rahway, N.J., a corporation of New Jersey
No Drawing. Filed July 26, 1967, Ser. No. 656,021
Int. Cl. C07d 27/56
U.S. Cl. 260—326.13                          4 Claims

ABSTRACT OF THE DISCLOSURE

This invention relates to a novel method for preparing certain α-(1-aroyl-3-indolyl)alkanoic acids which compounds are potent anti-inflammatory agents. Also included are novel nitro or amino substituted α-(1-aroyl-3-idolyl)alkanoic acids and esters thereof.

This invention relates to a new method of preparing certain alpha-(1-aroyl-3-indolyl)alkanoic acids and to new intermediates therefor. More particularly, it relates to a method of preparing 1-p-chlorobenzoyl-2-methyl-3-indolyl-acetic acids of the Formula I:

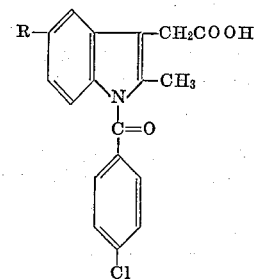

I wherein R is methoxy or dimethylamino. These compounds are disclosed and claimed in U.S. Patent No. 3,161,654, issued Dec. 15, 1964, to Shen.

In the Shen patent, 1-p-chlorobenzoyl-2-methyl-3-indolylacetic acids are prepared by a series of reactions in which a 3-indolylacetic acid is dehydrated to the corresponding anhydride; the anhydride is treated with t-butyl alcohol to give the corresponding ester; the t-butyl ester is then acylated at the 1-position with p-chlorobenzoyl chloride; and the resulting 1-acylate is converted to the free acetic acid derivative by a pyrolysis process. It is an object of this invention to provide an alternative route to these compounds. It is a further object to provide new intermediates for use in the method of this invention. Other objects will be apparent hereinafter.

In accordance with the present invention, it has been discovered that compounds of Formula I can be prepared by transformation of a nitro derivative of the following Formula II:

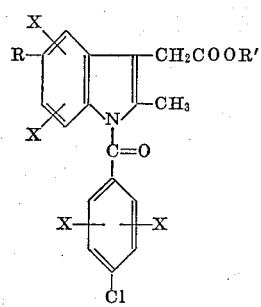

II wherein R is as defined above, R' is hydrogen, lower alkyl (e.g., methyl and t-butyl) or an aralkyl group (e.g., benzyl) and each X is independently nitro or hydrogen, at least one X being nitro.

The transformation of the nitro compounds of Formula II to the desired compounds of Formula I can be effected by the catalytic reduction of the nitro starting material to the corresponding amino analog; diazotization of the amino group or groups to the corresponding diazonium salt; and reduction of the diazonium group by chemical reducing means. The catalytic reducing step simultaneously replaces the esterifying radical (the symbol R' in Formula II) with hydrogen when R' is aralkyl. When R' is alkyl, an additional deesterification step is required to give the desired free acid of Formula I.

Reduction of the nitro starting materials of Formula II is preferably effected by catalytic means. Suitable reducing systems comprise a noble metal catalyst and hydrogen. The preferred catalyst is palladium on carbon. The reduction process is continued until three moles of hydrogen have been taken up for each of the nitro groups in the starting material. The resulting amino compounds are of the Formula III:

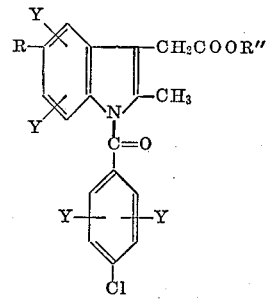

III wherein each Y is independently either hydrogen or amino and at least one Y is amino (corresponding to the nitro group or groups of the starting material) and R'' is hydrogen or lower alkyl.

The amino compounds of Formula III are converted to the desired compounds of Formula I by deesterification; if R'' is alkyl, diazotization of the amino groups and then reduction of the resulting diazonium, preferably by chemical means. A suitable reducing agent for this purpose is hypophosphorous acid. This reduction step, followed by concentration of the filtrate and recrystallization from an alcohol, affords the compounds of Formula I in pure form.

The nitro compounds of Formula II are new compounds which may be obtained by several different routes. Thus, by one route, an indole compound of the Formula IV:

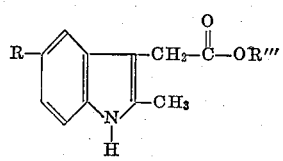

IV wherein R is as defined above and R''' is alkyl or aralkyl, is nitrated with concentrated nitric acid. The quantity of nitric acid used depends upon the number of nitro groups which it is desired to substitute on the starting material.

Where it is desired to have only one nitro group, about one equivalent of nitric acid should be used for each equivalent of the indole. If it is desired to have two nitro groups on the indole nucleus, at least two equivalents of nitric acid must be used. Nitration is effected at reduced temperatures, i.e., 0–10° C. The nitration mixture, after quenching in water, is extracted with chloroform and the chloroform extracts are collected, dried and concentrated. The residue can be separated into mono- and di-nitration products by chromatography over neutral alumina with fractional analysis techniques. There is thus obtained each of the following types of compounds in relatively pure form: an ester of 2-nitro-5-R-3-indolylacetic acid; an ester of 2-methyl-4,6-dinitro-5-R-3-indolylacetic acid; and an ester of 2-methyl-5-R-6-nitro-3-indolylacetic acid.

Treatment of the mono-nitro and di-nitro derivatives of 2-methyl-5-R-3-indolylacetates with 1-p-chlorobenzoyl chloride having up to two nitro groups affords the 1-benzoylated starting esters of Formula II. 1-benzoylation is effected in a solvent such as dimethylformamide, tetrahydrofuran or dioxane in the presence of an alkali metal hydride. The compounds of Formula II wherein each X on the benzo portion of the indole nucleus is hydrogen and one or both of the X radicals on the benzoyl group are nitro are prepared by the above-described 1-benzoylation procedure except that the indole starting material which is used, is free of nitro groups. In this manner, there can be obtained an alkyl or aralkyl ester of a 1-(3-nitro-4-chlorobenzoyl) or a 1-(3,5-dinitro-4-chlorobenzoyl)-2-methyl-5-R-3-indolylacetic acid.

The alkyl esters obtained by the foregoing procedure must be subjected to a preliminary deesterification step to give the acid of Formula II (i.e., R'=H). This deesterification is readily achieved by several methods. If the alkyl group is methyl or the like, treatment with lithium iodide and 2,6-lutidine gives the desired acid. If the alkyl group is t-butyl or the like, deesterification is effected by means of acid catalysis (e.g., by refluxing the ester in toluene in the presence of free p-toluenesulfonic acid).

The following examples are presented to further illustrate the present invention.

EXAMPLE 1

Preparation of benzyl-2-methyl-4-nitro-5 - methoxy - 3-indolylacetate; benzyl 2 - methyl-6-nitro-5-methoxy-3-indolylacetate; and benzyl 2 - methyl - 4,6 - dinitro - 5-methoxy-3-indolylacetate Benzyl 2-methyl-5-methoxy-3-indolylacetate (16 g.) in 500 ml. of concentrated nitric acid was stirred at 5° C. for two hours. The mixture was poured into ice water and extracted thoroughly with chloroform. The chloroform solution was dried and concentrated. The residue containing the mixture of the nitro products was resolved into its component parts by chromatography on 400 g. of neutral alumina with the fractional analysis technique. Fractions of the single components were combined and concentrated to yield respectively, benzyl 2-methyl-4-nitro-5 - methoxy - 3-indolylacetate; benzyl 2-methyl-6-nitro-5-methoxy - 3 - indolylacetate; and benzyl 2-methyl-4,6-dinitro-5-methoxy-3-indolylacetate.

The corresponding mono-nitro and di-nitro t-butyl esters are obtained when t-butyl 2-methyl-5-methoxy-3-indolylacetate is substituted in the procedure of Example 1.

EXAMPLE 2

Preparation of benzyl-2-methyl-4-nitro-5-dimethylamino-3-indolylacetate; benzyl 2 - methyl-6-nitro-5-dimethylamino - 3 - indolylacetate; and benzyl 2-methyl-4,6-dinitro-5-dimethylamino-3-indolylacetate Benzyl 2-methyl-5-dimethylamino-3-indolylacetate (17 g.) in 500 ml. of concentrated nitric acid was stirred at 5° C. for two hours. The mixture was poured into ice water, pH adjusted to 2–3 with NaOH and extracted with chloroform. The chloroform solution was dried and concentrated. The residue containing the mixture of the nitro products was resolved into its component parts by chromatography on 400 g. of neutral alumina with the fractional analysis technique. Fractions of the single components were combined and concentrated to yield respectively, benzyl 2-methyl-4-nitro-5-dimethylamino-3-indolylacetate; benzyl 2 - methyl - 6 - nitro-5-dimethylamino-3-indolylacetate; and benzyl 2 - methyl - 4,6 - dinitro - 5-dimethylamino-3-indolylacetate.

The corresponding mono-nitro and di-nitro t-butyl esters are obtained when t-butyl 2-methyl-5-dimethylamino-3-indolylacetate is substituted in the procedure of Example 2.

EXAMPLE 3

Preparation of benzyl 1-(3'-nitro-4'-chlorobenzoyl)-2-methyl-4-nitro-5-methoxy-3-indolylacetate To a solution of 5 g. of benzyl 2-methyl-4-nitro-5-methoxy-3-indolylacetate in 50 ml. of dry dimethylformamide was added a slurry of 10% molar excess of 50% sodium hydride emulsion in 25 ml. of dimethylformamide. The mixture was cooled to 0° C. and a 20% molar excess of 3-nitro-4-chlorobenzoyl chloride was added. The mixture was aged for two hours and then cautiously decomposed by addition of acetic acid. The mixture was further diluted with water and extracted with chloroform. The chloroform extracts were dried and concentrated to give benzyl 1-(3'-nitro-4'-chlorobenzoyl)-2 - methyl-4-nitro-5-methoxy-3-indolylacetate.

By substituting 3,5-dinitro-4-chlorobenzoyl chloride in the foregoing procedure in place of the benzoyl chloride used therein, there is obtained benzyl 1-(3',5'-dinitro-4'-chlorobenzoyl)-2-methyl-4-nitro - 5 - methoxy-3-indolylacetate.

The t-butyl ester corresponding to the benzyl ester prepared in Example 1 can be obtained by substituting t-butyl 2-methyl - 4 - nitro-5-methoxy-3-indolylacetate for the benzyl ester used therein.

EXAMPLE 4

Preparation of benzyl 1-(3'-nitro-4'-chlorobenzoyl)-2-methyl-4-nitro-5-dimethylamino-3-indolylacetate To a solution of 5 g. of benzyl 2-methyl-4-nitro-5-dimethyl amino-3-indolylacetate in 50 ml. of dry dimethylformamide was added a slurry of 10% molar excess of 50% sodium hydride emulsion in 25 ml. of dimethylformamide. The mixture was cooled to 0° C. and a 20% molar excess of 3-nitro-4-chlorobenzoyl chloride was added. The mixture was aged for two hours and then cautiously decomposed by addition of acetic acid. The mixture was further diluted with water and extracted with chloroform. The chloroform extracts were dried and concentrated to give benzyl 1 - (3' - nitro-4'-chlorobenzoyl)-2-methyl-4-nitro-5-dimethylamino-3-indolylacetate.

By substituting 3,5-dinitro-4-chlorobenzoyl chloride in the foregoing procedure in place of the benzoyl chloride used therein, there is obtained benzyl 1-(3',5'-dinitro-4'-chlorobenzoyl)-2-methyl-4-nitro - 5 - dimethylamino-3-indolylacetate.

The t-butyl ester corresponding to the benzyl ester prepared in Example 2 can be obtained by substituting t-butyl 2 - methyl - 4 - nitro-5-dimethylamino-3-indolylacetate for the benzyl ester used therein.

EXAMPLE 5

Preparation of benzyl 1-(3'-nitro-4'-chlorobenzoyl)-2-methyl-5-methoxy-3-indolylacetate To a solution of 5 g. of benzyl 2-methyl-5-methoxy-3-indolylacetate in 50 ml. of dry dimethylformamide was added a slurry of 10% molar excess of 50% sodium hydride emulsion in 25 ml. of dimethylformamide. The mixture was cooled to 0° C. and a 20% molar excess of 3-nitro-4-chlorobenzoyl chloride was added. The mixture was aged for two hours and then cautiously decomposed by addition of acetic acid. The mixture was further diluted with water and extracted with chloroform. The chloroform extracts were dried and concentrated to give benzyl 1-(3'-nitro-4'-chlorobenzoyl)-2-methyl-5-methoxy-3-indolylacetate.

EXAMPLE 6

Preparation of benzyl 1-(3'-nitro-4'-chlorobenzoyl)-2-methyl-5-dimethylamino-3-indolylacetate To a solution of 5 g. of benzyl 2-methyl-5-dimethylamino-3-indolylacetate in 50 ml. of dry dimethylformamide was added a slurry of 10% molar excess of 50% sodium hydride emulsion in 25 ml. of dimethylformamide. The mixture was cooled to 0° C. and a 20% molar excess of 3-nitro-4-chlorobenzoyl chloride was added. The mixture was aged for two hours and then cautiously decomposed by addition of acetic acid. The mixture was further diluted with water and extracted with chloroform. The chloroform extracts were dried and concentrated to give benzyl 1-(3'-nitro-4'-chlorobenzoyl)-2-methyl-5-dimethylamino-3-indolylacetate.

EXAMPLE 7

Preparation of 1-(3'-amino-4'-chlorobenzoyl)-2-methyl-4-amino-5-methoxy-3-indolylacetic acid A solution of 3.0 g. of benzyl 1-(3'-nitro-4'-chlorobenzoyl)-2-methyl-4-nitro-5-methoxy-3-indolylacetate in 50 ml. of acetic acid containing 1.05 molar equivalents of hydrogen chloride was reduced at 25° C. under 40 p.s.i. of hydrogen using 0.3 g. of 10% palladium-carbon catalyst. After 7.0 moles of hydrogen had been taken up, the solution was diluted with 50 ml. of acetic acid and then heated to 60° C. The catalyst was removed by filtration, leaving the desired product in the filtrate.

By substituting the t-butyl ester of 1-(3'-nitro-4'-chlorobenzoyl) - 2 - methyl-4-nitro-5-methoxy-3-indolylacetic acid into the procedure of Example 7 in place of the benzyl ester used therein, t-butyl-(3'-amino-4'-chlorobenzoyl) - 2 - methyl-4-amino-5-methoxy-3-indolylacetate is obtained.

EXAMPLE 8

Preparation of 1-(3'-amino-4'-chlorobenzoyl)-2-methyl-4-amino-5-dimethylamino-3-indolylacetic acid A solution of 3.0 g. of benzyl 1-(3'-nitro-4'-chlorobenzoyl) - 2 - methyl - 4-nitro-5-dimethylamino-3-indolylacetate in 50 ml. of acetic acid containing 1.05 molar equivalents of hydrogen chloride was reduced at 25° C. under 40 p.s.i. of hydrogen using 0.3 g. of 10% palladium-carbon catalyst. After 7.0 moles of hydrogen had been taken up, the solution was diluted with 50 ml. of acetic acid and then heated to 60° C. The catalyst was removed by filtration, leaving the desired product in the filtrate.

By substituting the t-butyl ester of 1-(3'-nitro-4'-chlorobenzoyl)-2-methyl-4-nitro-5-dimethylamino - 3 - indolylacetic acid into the procedure of Example 8 in place of the benzyl ester used therein, t-butyl-(3'-amino-4'-chlorobenzoyl)-2-methyl-4-amino-5-dimethylamino - 3 - indolylacetate is obtained.

EXAMPLE 9

Preparation of 1-(3'-amino-4'-chlorobenzoyl)-2-methyl-5-methoxy-3-indolylacetic acid Following the procedure of Example 7 except for the substitution of benzyl 1-(3'-nitro - 4' - chlorobenzoyl)-2 methyl-5-methoxy-3-indolylacetic acid for the acetic acid derivative used therein, there is obtained 1-(3'-amino-4'-chlorobenzoyl)-2-methyl-5-methoxy-3-indolylacetic acid.

EXAMPLE 10

Preparation of 1-(3'-amino-4'-chlorobenzoyl)-2methyl-5-dimethylamino-3-indolylacetic acid Following the procedure of Example 8 except for the substitution of benzyl 1-(3'-nitro - 4' - chlorobenzoyl)-2-methyl - 5 - dimethylamino - 3 - indolylacetic acid for the acetic acid derivative used therein, there is obtained 1-(3'-amino - 4' - chlorobenzoyl) - 2 - methyl - 5 - dimethylamino-3-indolylacetic acid.

EXAMPLE 11

Preparation of 1-p-chlorobenzoyl-2-methyl-5-methoxy-3-indolylacetic acid

Ethyl nitrite was bubbled into the acetic acid filtrate of Example 7 to which had been added dioxane to lower the freezing point to 0° C. The mixture was then added to 100 ml. of 30% hypophosphorous acid at 5° C. The product was extracted into warm toluene, the toluene extracts were combined, washed, dried and concentrated to give crude 1-p-chlorobenzoyl-2-methyl-5-methoxy - 3 - indolylacetic acid. Recrystallization of the latter from t-butanol gave the pure product.

EXAMPLE 12

Preparation of 1-p-chlorobenzoyl-2-methyl-5-dimethylamino-3-indolylacetic acid

Ethyl nitrite was bubbled into the acetic acid filtrate of Example 8 to which had been added dioxane to lower the freezing point to 0° C. The mixture was then added to 200 ml. of 30% hypophosphorous acid at 5° C. The pH was adjusted to 2–3 and the mixture extracted thoroughly with chloroform. The chloroform extracts were combined and washed thoroughly with water, dried over sodium sulfate, and concentrated. The residue was dissolved in hot ethanol and then allowed to crystallize to give substantially pure 1 - p-chlorobenzoyl-2-methyl-5-dimethylamino-3-indolylacetic acid.

EXAMPLE 13

Preparation of 1-p-chlorobenzoyl-2-methyl-5-methoxy-3-indolylacetic acid

The acetic acid filtrate of Example 9 containing 1-(3'-amino-4'-chlorobenzoyl)-2-methyl-5-methoxy - 3 - indolylacetic acid was concentrated to dryness and treated with 100 ml. of 10% hydrochloric acid and 15.0 g. of 50% hypophosphorous acid. Sodium nitrite (1.10 equivalent) in 20 ml. of water was then added. The mixture was stirred at 20° C. until nitrogen evolution ceased. The product was extracted thoroughly with warm toluene and the toluene extracts were combined, washed with water, dried and concentrated. Recrystallization of the residue from t-butanol afforded pure 1-p-chlorobenzoyl-2-methyl - 5 - methoxy-3-indolylacetic acid.

The substitution of 1-p-chlorobenzoyl - 2 - methyl-5-methoxy-6-amino - 3 - indolylacetic acid or 1-p-chlorobenzoyl-2-methyl-4,6-diamino - 5 - methoxy - 3 - indolylacetic acid, respectively, in the foregoing procedure afforded the same product.

EXAMPLE 14

Preparation of 1-p-chlorobenzoyl-2-methyl-5-dimethylamino-3-indolylacetic acid

The acetic acid filtrate of Example 10 containing 1-(3'-amino - 4' - chlorobenzoyl)-2-methyl-5-dimethylamino-3-indolylacetic acid was concentrated to dryness and treated with 100 ml. of 10% hydrochloric acid and 15.0 g. of 50% hypophosphorous. Sodium nitrite (1.10 equivalent) in 20 ml. of water was then added. The mixture was stirred at 20° C. until nitrogen evolution ceased. The pH was adjusted to 2–3 and the mixture extracted thoroughly with chloroform. The chloroform extracts were combined and washed thoroughly with water, dried over sodium sulfate, and concentrated. The residue was dissolved in hot ethanol and then allowed to crystallize to give substantially pure 1-p-chlorobenzoyl-2-methyl-5-dimethylamino - 3 - indolylacetic acid.

The substitution of 1-p-chlorobenzoyl-2-methyl-5-dimethylamino-6-amino-3-indolylacetic acid or 1-p-chlorobenzoyl-2-methyl-4,6 - diamino-5-dimethylamino - 3 - indolylacetic acid, respectively, in the foregoing procedure afforded the same product.

What is claimed is:
1. A compound of the formula:

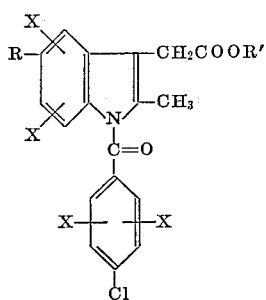

wherein R is methoxy or dimethylamino, R' is hydrogen, lower alkyl, or benzyl and each X is independently either nitro or hydrogen, at least one X in each of the two benzenoid rings being nitro.

2. The compound of claim 1 wherein R is methoxy.

3. A compound of the formula:

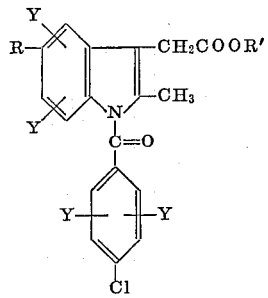

wherein R is methoxy or dimethylamino, each Y is independently either amino or hydrogen, at least one Y in each of the two benzenoid rings being amino, and R" is hydrogen or lower alkyl.

4. The compound of claim 3 wherein R is methoxy.

References Cited
UNITED STATES PATENTS
3,161,654  12/1964  Shen _____ 260—326.12

ALEX MAZEL, Primary Examiner
J. A. NARCAVAGE, Assistant Examiner

U.S. Cl. X.R.
260—326.14

UNITED STATES PATENT OFFICE
CERTIFICATE OF CORRECTION

Patent No. 3,501,498　　　　　　　Dated　March 17, 1970

Inventor(s) _____

It is certified that error appears in the above-identified patent and that said Letters Patent are hereby corrected as shown below:

Column 8, claim 3 - formula, that portion of the formula reading $CH_2COOR'$　　　should read　　　$CH_2COOR''$

SIGNED AND
SEALED
AUG 11 1970

(SEAL)
Attest:

Edward M. Fletcher, Jr.
Attesting Officer

WILLIAM E. SCHUYLER, JR.
Commissioner of Patents